United States Patent [19]

Tomita et al.

[11] 4,220,441
[45] Sep. 2, 1980

[54] APPARATUS FOR MAKING PRILLS FROM MELTED SUBSTANCE

[75] Inventors: Shoji Tomita; Tetsuya Tokunaga, both of Fujieda, Japan

[73] Assignee: Sumitomo Durez Company, Ltd., Tokyo, Japan

[21] Appl. No.: 960,692

[22] Filed: Nov. 14, 1978

[30] Foreign Application Priority Data

Dec. 13, 1977 [JP] Japan .................... 52-148843

[51] Int. Cl.² ............................. B22D 11/01
[52] U.S. Cl. ............................. 425/6; 264/13
[58] Field of Search ..................... 425/6; 264/13

[56] References Cited

U.S. PATENT DOCUMENTS

| | | | |
|---|---|---|---|
| 2,510,574 | 6/1950 | Greenhalgh | 425/6 |
| 2,898,625 | 8/1959 | Chao | 425/6 |
| 3,642,393 | 2/1972 | Ross et al. | 425/6 |
| 3,677,669 | 7/1972 | Bliemeister | 425/6 |

Primary Examiner—Donald J. Arnold
Assistant Examiner—James R. Hall
Attorney, Agent, or Firm—Peter F. Casella; James F. Mudd

[57] ABSTRACT

An improved prilling tower is provided for the prilling of molten substances wherein a receiver equipped with an exhaust conduit is positioned below the nozzle during pre-heating of the nozzle prior to normal operation, after the end of a normal operating cycle or when the nozzle is replaced during operation of the prilling tower. Means are provided for moving either the receiver or the nozzle in a horizontal direction so that the nozzle is out of proximity with the receiver during normal operation of the prilling tower. More than one nozzle or more than one receiver can be employed in a prilling tower to provide for continuous operation of the prilling tower during replacement or cleaning of the nozzles.

8 Claims, 4 Drawing Figures

APPARATUS FOR MAKING PRILLS FROM MELTED SUBSTANCE

BACKGROUND OF THE INVENTION

The present invention relates to an apparatus for making prills by showering or spraying a melted substance from a nozzle provided at the top of a tower and an apparatus therefor.

Various prilling processes have been proposed for making prills from highly hydroscopic substances such as urea or from substances which are difficult to handle in powder form, thereby improving the flowability and preventing dust generation. Among these, the principal approach is the melt prilling process, and particularly employed widely is the so-called spray prilling process in which a melted substance is showered or sprayed from the top of a tower by a nozzle for making particles by spraying through small holes or orifices or by a rotary disc for making particles by centrifugal force, and prills are obtained either by drying or solidifying the dropping liquid particles with counter-current gas introduced from the bottom of the tower, or by dropping said liquid particles into a medium inert to said melted substance.

In such prilling process, smooth passage of the melted substance through the nozzle is indispensable. In this connection pre-heating of the nozzle is particularly important so as to prevent viscosity increase of the melted substance in the vicinity of nozzle at the start of prilling process. In the absence of preheating, or in case of insufficient pre-heating, the melted substance present in the vicinity of the nozzle is cooled to show a viscosity increase or eventually solidifies and clogs the nozzle thereby rendering the operation impossible. In such case, the substance, once having solidified in the nozzle, is not easily melted even by forced heating, and the nozzle has to be removed for cleaning or replaced by a new nozzle followed by resumed pre-heating before the prilling operation can be started. Also, even if the nozzle is not clogged completely, partial clogging of the nozzle will result in formation of relatively large dripping liquid particles which drop in an unsolidified state and stick to the bottom of the tower. The presence of such sticking unsolidified substance will cause reheating, by the heat accumulated therein, of other particles which have been completely solidified during the drop, thereby resoftening such particles and thus forming a deposit on the bottom of tower, rendering discharge of prills difficult. It therefore becomes necessary to interrupt the operation and remove the deposit formed on the bottom of the tower. Such deposit, being a defective product, not only reduces the yield of production but also hinders continuous operation.

In general the nozzle is mounted at the bottom of the spray chamber which is provided with a jacket for heating with steam or a heating medium to maintain the temperature of said chamber, but such heating is hardly capable of heating the nozzle. However, as explained in the foregoing, a complete pre-heating of the nozzle is indispensable.

For such nozzle pre-heating there are already methods known of externally pre-heating it with infrared irradiation or with resistor type heaters and of externally pre-heating it with hot air blowing. However these pre-heating methods, all depend on external heating and mostly utilize radiant heating and thus of a low heating efficiency which is further reduced by air flow from the bottom of the tower, were unable to exhibit a sufficient heating effect even after a prolonged pre-heating time.

Replacement of nozzles during operation of a prilling tower is hazardous. The nozzle replacement should be conducted at a relatively early stage of operation since the nozzle may be partially clogged. Even during operation, partial clogging of the nozzle with the melted substance results in formation of relatively large liquid particles which drop in unsolidified state and stick to the bottom of the tower, forming a deposit thereon which grows larger as the operation is continued, thus rendering discharge of prills difficult. In such state it therefore becomes necessary to interrupt the operation and remove the deposit formed on the bottom of the tower. In order to prevent such a situation, the nozzle should be under constant watch during the operation and exchanged at a relatively early stage. The nozzle replacement is performed while the supply of melted substance to the nozzle is temporarily interrupted and after the melted substance present in the spray chamber is removed. The normal replacing operation is dangerous as it involves the melted substance and nozzle of high temperature, and handling of the melted substance extracted at the top of the tower poses a cumbersome problem. Also at the end of operation cautious measures have to be taken as there tend to appear fiber-like product and deposit on the bottom.

SUMMARY OF THE INVENTION

The present inventors have found that highly effective pre-heating of the nozzle can be achieved by internally heating it by introducing steam or heated gas through the feed pipe for the melted substance or directly into the spray chamber provided at the top of the tower.

One object of the present invention is to provide a prilling apparatus capable of advantageously conducting pre-heating based on the above-mentioned finding, and, further, allowing prompt, easy and safe replacement of the nozzle thereby rendering prolonged continuous prilling operation possible without formation of defective products.

Moreover, the above-mentioned various difficulties with respect to nozzle replacement are completely solved by the present invention which provides a prilling apparatus wherein the nozzle is suitably shifted in a horizontal direction, after pre-heating, during prilling operation, at the end of operation or for replacement of the nozzle, and a receiver or receivers are provided on one side or on both sides under said shifting device, or a movable receiver is provided under the nozzle.

DESCRIPTION OF EMBODIMENTS

Now there will be given an explanation of the apparatus of the present invention, while making reference to the accompanying drawings.

The above-mentioned receivers are provided with exhaust pipes for removing a substance received thereby (melted substance or a heating medium used for pre-heating) from the prilling tower. Such receiver is preferably provided with a jacekt for heating with steam or other heating medium. The melted substance removed from the tower can be purified, if necessary, and returned to the melting tank for re-use as atarting material.

Figure 1:
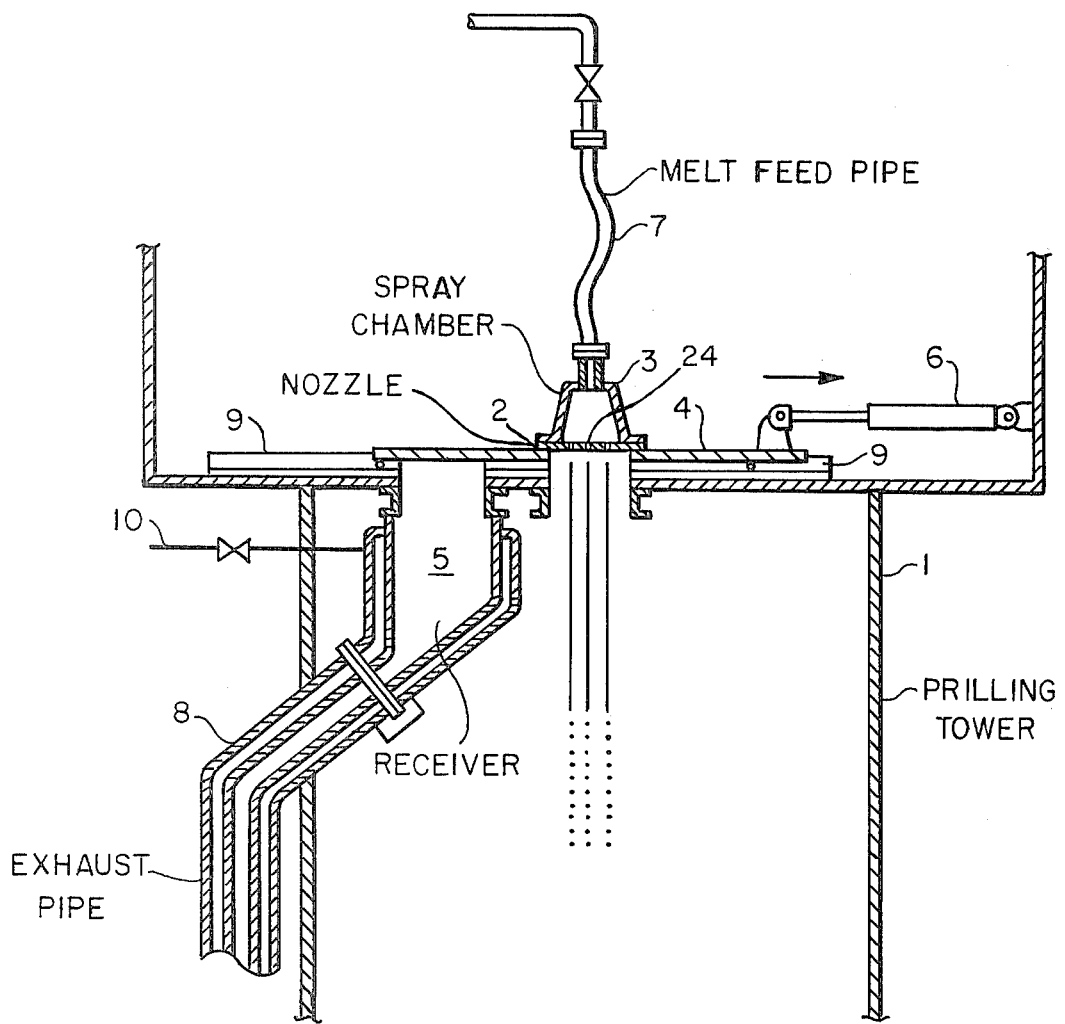
FIG. 1 shows an embodiment of the apparatus of the present invention wherein shift of the nozzle is effected in two stages, the apparatus being shown in the state of normal prilling operation, the nozzle is located at the center of the tower while the opening of the receiver is closed by the nozzle mounting plate.
Figure 2:
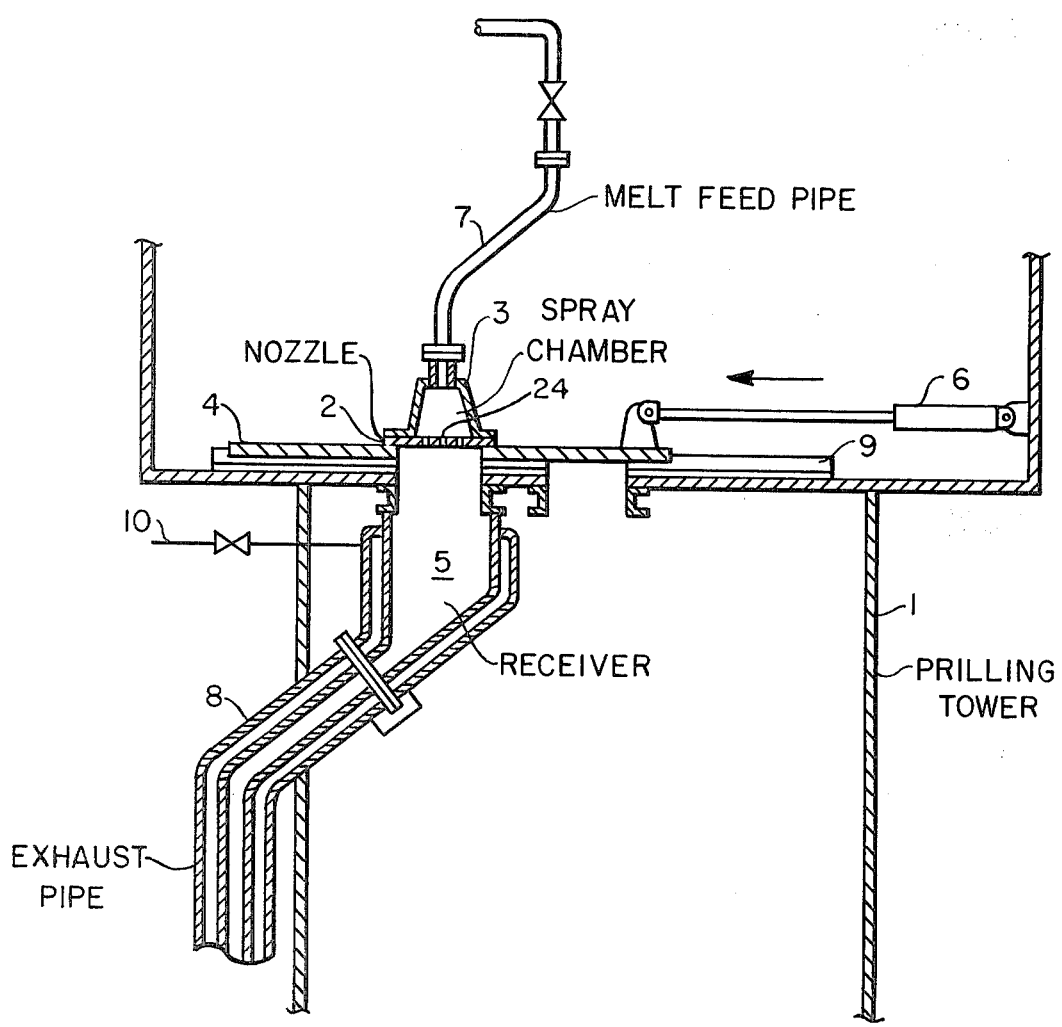
FIG. 2 shows said apparatus in a state other than for normal operation, i.e., of pre-heating, after the end of the prilling operation or of nozzle replacement. In this state the nozzle is located above the receiver, while the center opening is closed by the nozzle mounting plate, isolating the space above from the interior of the tower.

In FIGS. 1 and 2 there are shown prilling tower 1, nozzle 2 provided with orifices 24, spray chamber 3, movable nozzle mounting plate 4 which closes the other opening, when the nozzle is located on one opening, receiver 5 provided with a jacket for steam heating and exhaust pipe 8 for removing the received substance, air cylinder 6 for shifting the nozzle mounting plate, flexible tube 7 for connecting the spray chamber with the melt feed pipe, guide rail 9 for shifting the nozzle mounting plate, and steam pipe 10 for heating the receiver and the exhaust pipe.

Figure 3:
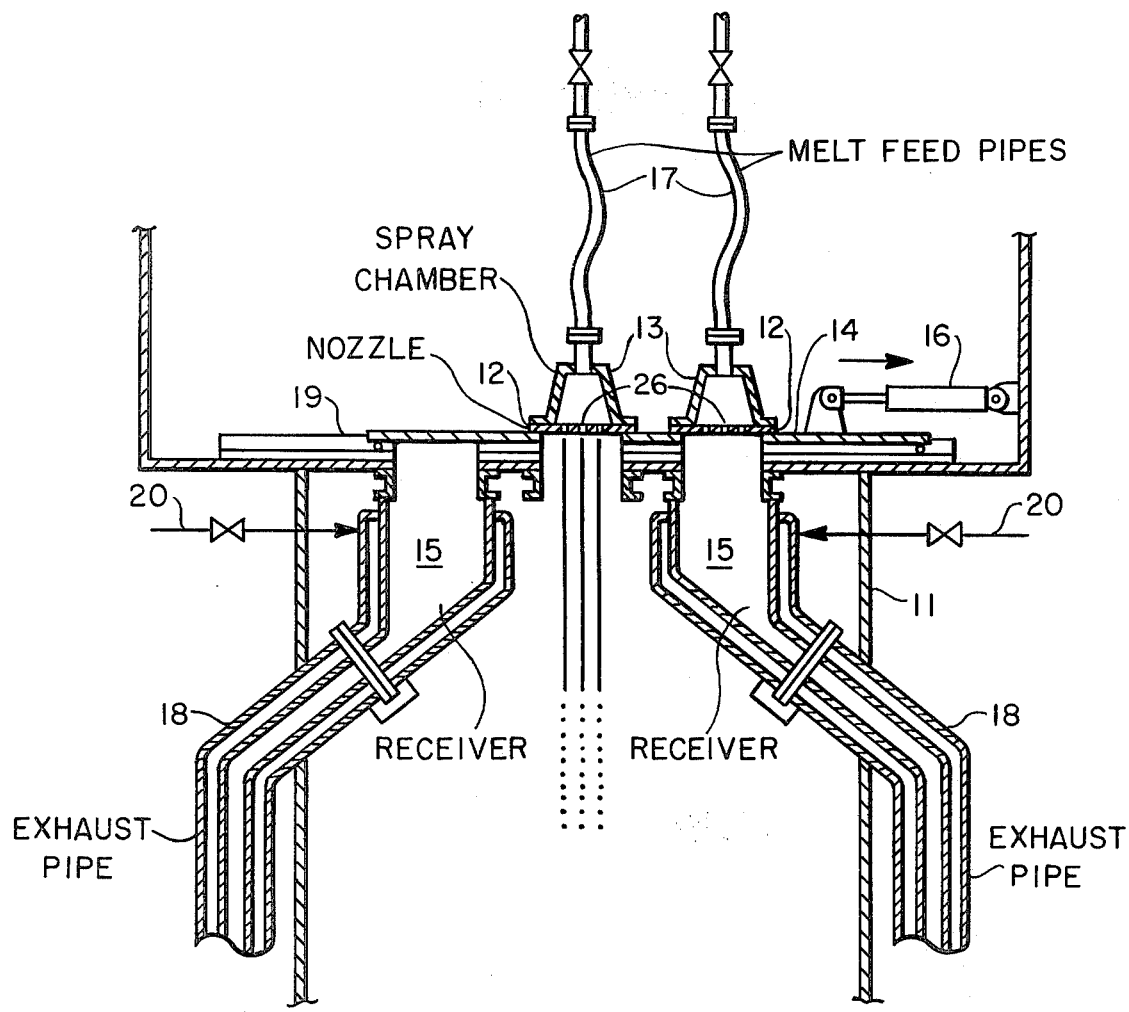
FIG. 3 shows an another embodiment provided with two nozzles which are movable in two stages, the apparatus being shown in a state wherein one of said two nozzles is under prilling operation. There are provided two receivers on both sides, and the other nozzle is in preparation for service.

In FIG. 3 there are shown prilling tower 11, nozzle 12, each provided with orifices 26, spray chambers 13, movable nozzle mounting plate 14 which closes the other opening, when the nozzle is located on one opening, receivers 15 provided with jackets for steam heating and exhaust pipes 18 for removing the received substance, air cylinder 16 for shifting the nozzle mounting plate, flexible tubes 17 for connecting the spray chamber with the melt feed pipe, guide rail 19 for shifting the nozzle mounting plate, and steam pipes 20 for heating the receiver and the exhaust pipe.

Figure 4:
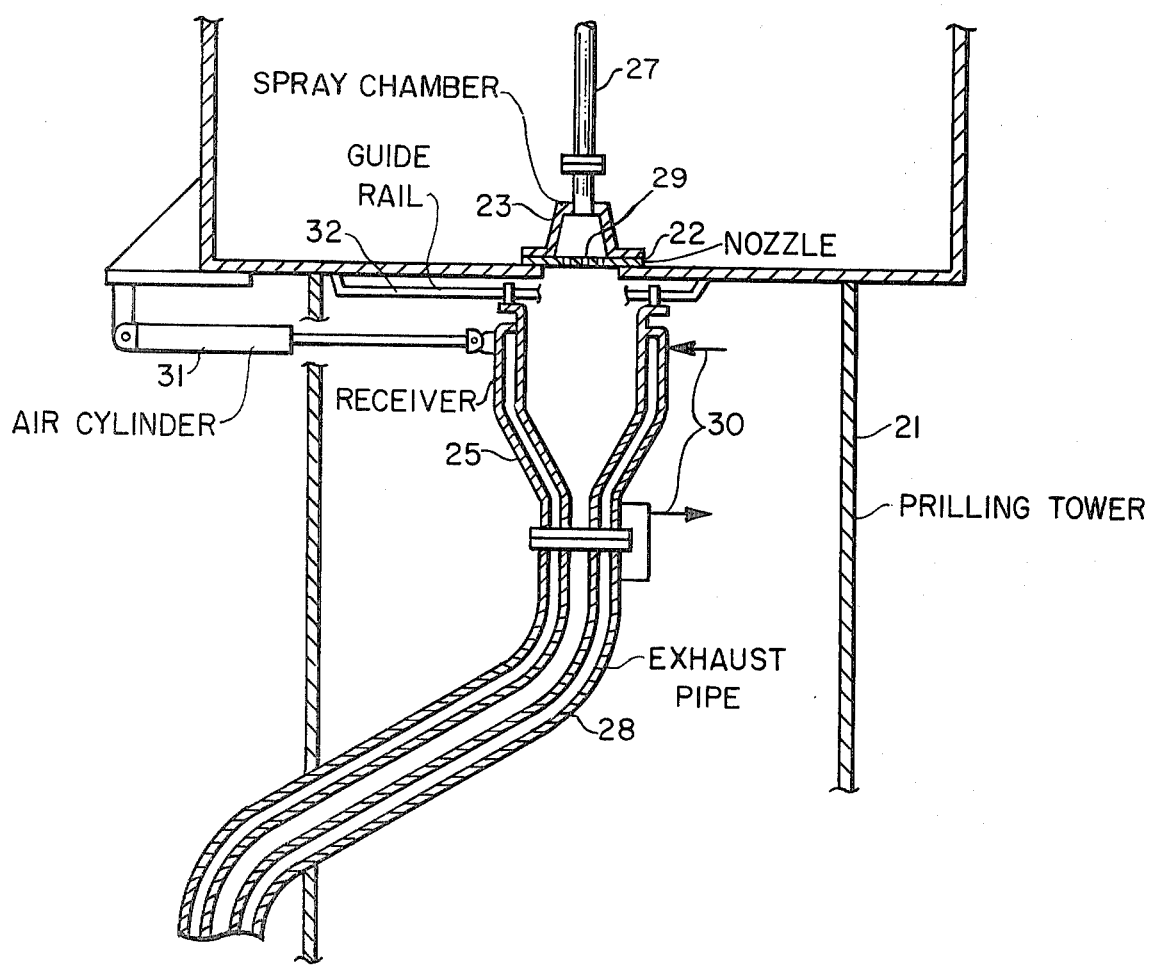
FIG. 4 shows an apparatus wherein the receiver is movable, the receiver being shown in a state for receiving a substance thereto. In the prilling operation the receiver is horizontally moved linearly or along an arc.

In FIG. 4 there are shown prilling tower 21, nozzle 22 provided with orifices 29, spray chamber 23, receiver 25 provided with a jacket for steam heating and an exhaust pipe 28 for removing the received substance, melt feed pipe 27 for connecting the spray chamber with the melt feed tank (not shown), steam pipe 30 for heating the receiver and the exhaust pipe, air cylinder 31 for shifting the receiver, and guide rail 32 for supporting the receiver.

When shift of the nozzle is effected in two stages, such as exemplified in FIGS. 1 and 2, the nozzle is located on the receiver in the first stage, and the nozzle is located at the center of the tower in the second stage. On the other hand, when shift of the nozzle is effected in three stages such as exemplified in FIG. 3, there are provided two receivers located on both sides so that the nozzle is positioned, at the pre-heating and after the end of operation, on different receivers. In such case it is possible to provide two nozzles and to use said nozzles alernately. Such three-stage shift is preferable since the prilling operation can be rendered continuous by repeating the above-mentioned operation. Also in case the receiver is movable such as exemplified in FIG. 4, there will be provided one or two receivers which can be horizontally shifted linearly or along an arc. The shift of such nozzles or receivers is preferably achieved along a guide rail by means of an air cylinder. Furthermore it is also possible to increase the prilling capacity by providing two or more systems of such nozzles or receivers.

The melted substance referred to in the present invention will include concentrated solutions and melted slurries which solidify at ambient temperature or a lower temperature but turn liquid at a higher temperature. Examples of such melted substance are wax, paraffin, polyolefins, fatty acids, organic acids, rosins, naphthalene, higher alcohols, phthalic anhydride, bisphenol-A, sulfur, urea, phenolic resins, epoxy resins, alkyd resins, petroleum resins, coumarone-indene resins, pitch, and the like.

The nozzle referred to in the present invention includes an ordinary pressurized nozzle, a two-fluid nozzle, a plate nozzle provided with a numerous small orifices and obtaining spray by gravity or by additional pressure, and a rotary disc nozzle. While such other forms of nozzles may be used, only the plate nozzle with orifices is shown in the drawings.

The apparatus of the present invention is advantageous in:

(1) complete and easy pre-heating of the nozzle;
(2) continuous operation rendered possible as the formation of deposit on the bottom of tower at the start of, during, or at the end of operation, can be almost completely avoided;
(3) easy replacement of nozzle without danger, and easy removal of melted substance from the top of tower and easy handling of said substance;
(4) significantly reduced formation of defective product, with resulting increase in production yield; and
(5) absence of flat or fiber-shaped product.

The present invention can be used in connection with the inventions disclosed in applications entitled "Prilling Process and Apparatus Therefor", Ser. No. 960,549, and "Prilling Process", Ser. No. 960,694, filed on even date herewith, the disclosures of which are incorporated herein by reference.

We claim:

1. In an apparatus for prilling a molten substance comprising a prilling tower, at least one nozzle in the upper portion of said tower, each nozzle having one or more orifices to form droplets of a molten substance passing through the orifices of said nozzle, and means for withdrawing prilled product from the lower portion of said tower, the improvement comprising means for moving said nozzle in a horizontal direction from its normal position during the prilling of a molten substance to a secondary position away from said normal position, and one or more receiving means disposed in said tower beneath the nozzle in the secondary position thereof.

2. The apparatus of claim 1 wherein said means for moving said nozzle comprises a guide rail on which said nozzle is slidably positioned and an air cylinder adapted to actuate the movement of said nozzle on said guide rail.

3. The apparatus according to claim 2 wherein said receiving means is provided with heating means to maintain a selected temperature of said receiving means.

4. The apparatus of claim 3 wherein said receiving means is provided with an exhaust conduit for removing the substance received by said receiving means from the tower.

5. In an apparatus for prilling a molten substance comprising a prilling tower, at least one nozzle in the upper portion of said tower, each nozzle having one or more orifices to form droplets of a molten substance passing through the orifices of said nozzle, and means for withdrawing prilled product from the lower portion of said tower, the improvement comprising one or more receiving means disposed in the upper portion of said tower adapted to be moved horizontally beneath the nozzle, and for moving said receiving means in a horizontal direction from a first position beneath said nozzle to a second position out of the proximity of the nozzle.

6. The apparatus of claim 5 wherein the means for moving said receiving means comprises a guide rail to which said receiving means is slidably attached and an air cylinder adapted to actuate the movement of said receiving means on said guide rail.

7. The apparatus of claim 6 wherein said receiving means is provided with heating means to maintain a selected temperature of said receiving means.

8. The apparatus of claim 7 wherein said receiving means is provided with an exhaust conduit for removing the substance received by said receiving means from the tower.

* * * * *